United States Patent
Gochenour et al.

(10) Patent No.: US 6,866,132 B2
(45) Date of Patent: Mar. 15, 2005

(54) FRICTION CLUTCH WITH INTERMEDIATE PLATE MOUNTING SYSTEM

(75) Inventors: Daniel V. Gochenour, Auburn, IN (US); Steven M. Peterson, Fort Wayne, IN (US); Kevin Schlosser, Auburn, IN (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/107,514

(22) Filed: Mar. 27, 2002

(65) Prior Publication Data
US 2003/0183475 A1 Oct. 2, 2003

(51) Int. Cl.[7] .............................................. F16D 13/56
(52) U.S. Cl. .................................. 192/70.18; 192/70.28
(58) Field of Search ........................... 192/70.25, 70.18, 192/70.28

(56) References Cited

U.S. PATENT DOCUMENTS

| | | | | |
|---|---|---|---|---|
| 4,257,502 A | | 3/1981 | Riese | 192/70.25 |
| 4,431,097 A | | 2/1984 | Scheer | 192/70.18 |
| 4,437,555 A | | 3/1984 | Tomm et al. | 192/70.21 |
| 4,751,990 A | | 6/1988 | Schraut et al. | |
| 4,848,555 A | * | 7/1989 | Riese et al. | 192/70.25 |
| 4,958,714 A | * | 9/1990 | Cooke et al. | 192/70.25 |
| 5,090,537 A | | 2/1992 | Fukuda | 192/70.27 |
| 5,170,873 A | * | 12/1992 | Fukuda | 192/70.25 |
| 5,226,515 A | * | 7/1993 | Hartshorn | 192/70.25 |
| 6,039,161 A | | 3/2000 | Tanaka et al. | 192/70.18 |

FOREIGN PATENT DOCUMENTS

| | | |
|---|---|---|
| DE | 3041342 A1 | 6/1982 |
| FR | 2 629 881 A1 | 10/1989 |

OTHER PUBLICATIONS

Derwent English Abstract for FR 2 629 881 A1.
International Search Report, 3 pages.

* cited by examiner

Primary Examiner—Richard M. Lorence
(74) Attorney, Agent, or Firm—Rader, Fishman & Grauer PLLC

(57) ABSTRACT

A friction clutch is provided that includes a clutch cover, an intermediate plate that is spaced apart from an engine flywheel, a first friction disk positioned between the flywheel and the intermediate plate, a pressure plate spaced apart from the intermediate plate and a second friction disk positioned between the intermediate plate and the pressure plate. The clutch further includes a first drive strap for applying a load to the intermediate plate, a second drive strap for applying a load to the pressure plate and a separator arm attached to the intermediate plate. The separator arm engages the second drive strap such that axial movement of the intermediate plate relative to the clutch cover is a fraction of the corresponding axial movement of the pressure plate during engagement and disengagement of the clutch.

29 Claims, 7 Drawing Sheets

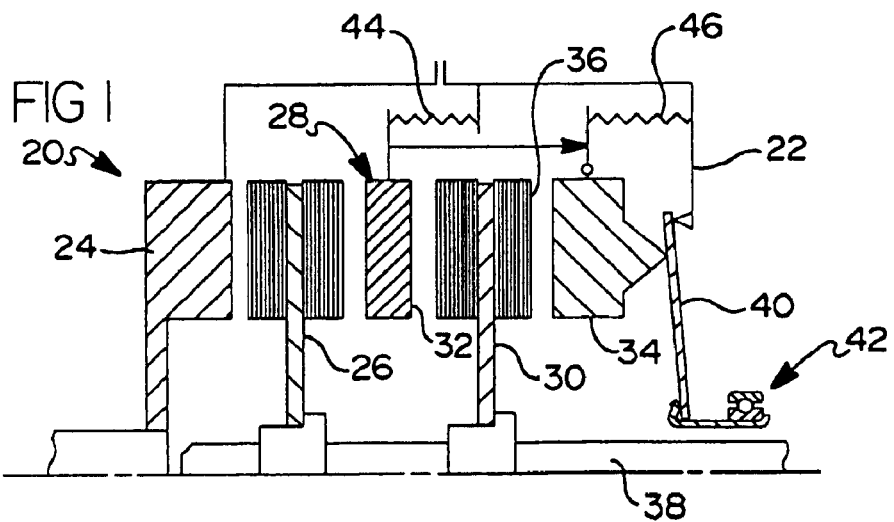
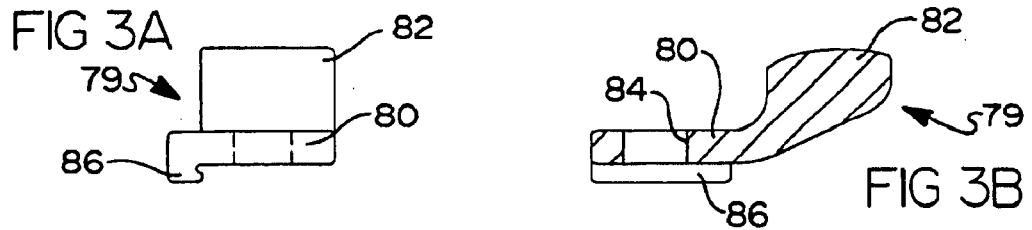
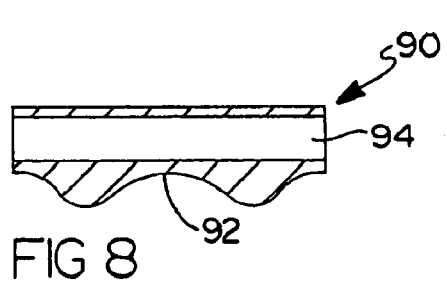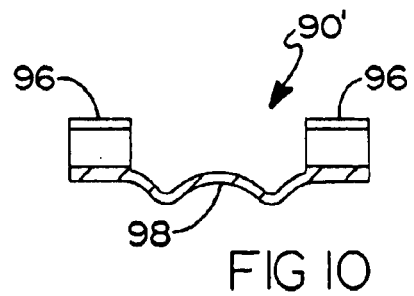

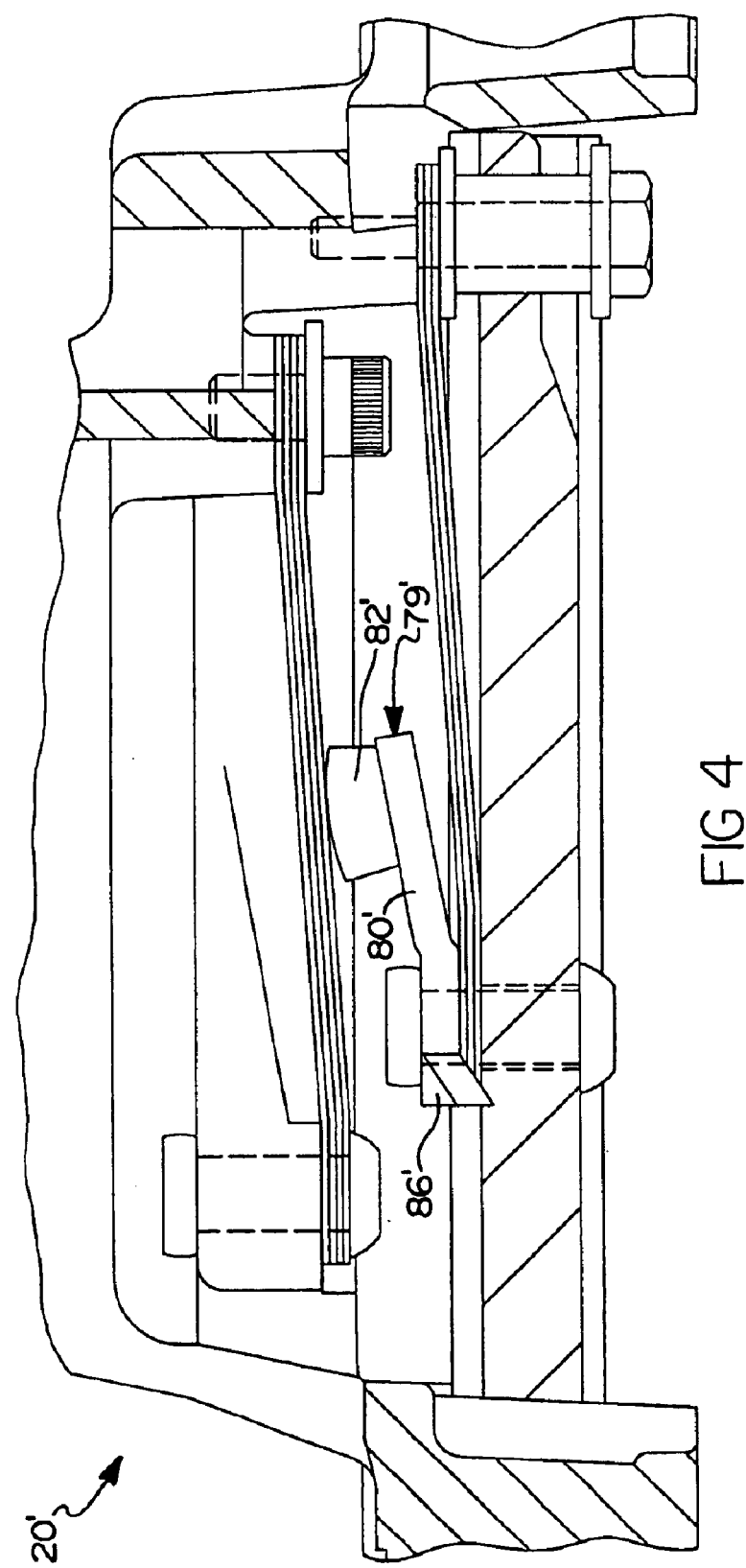

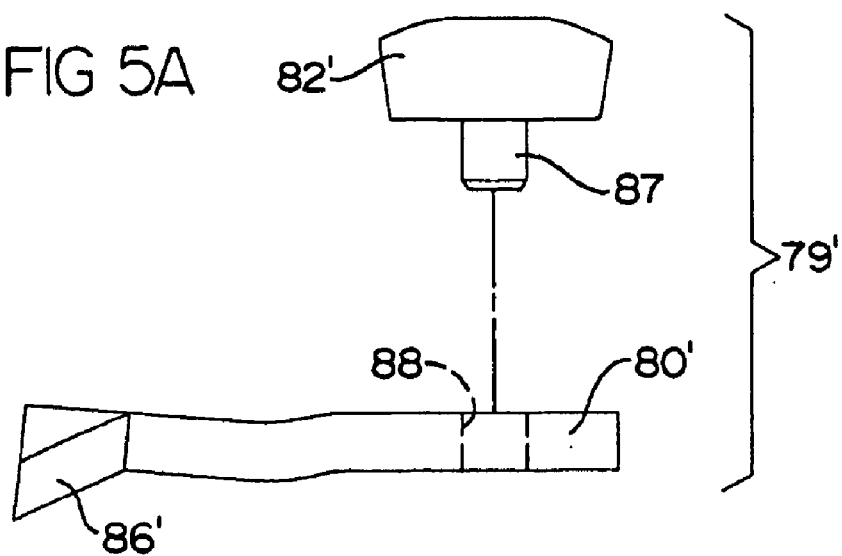
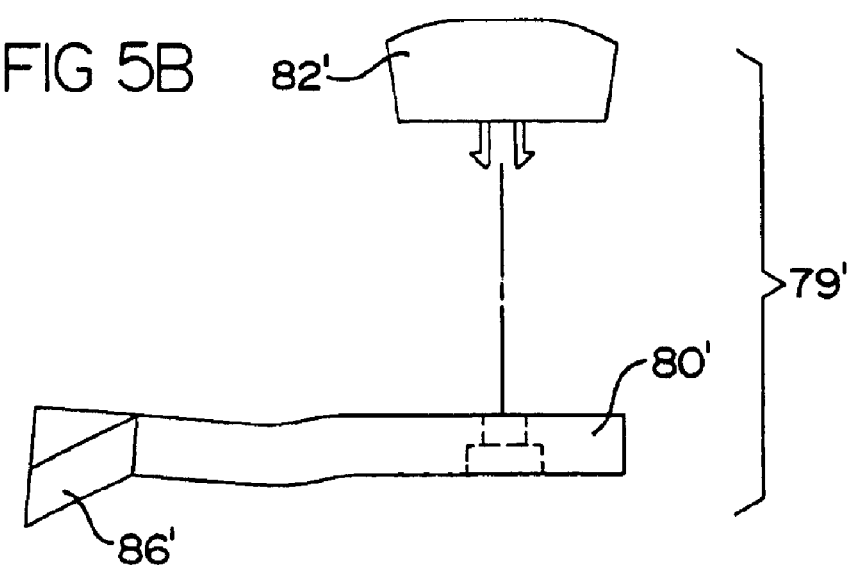

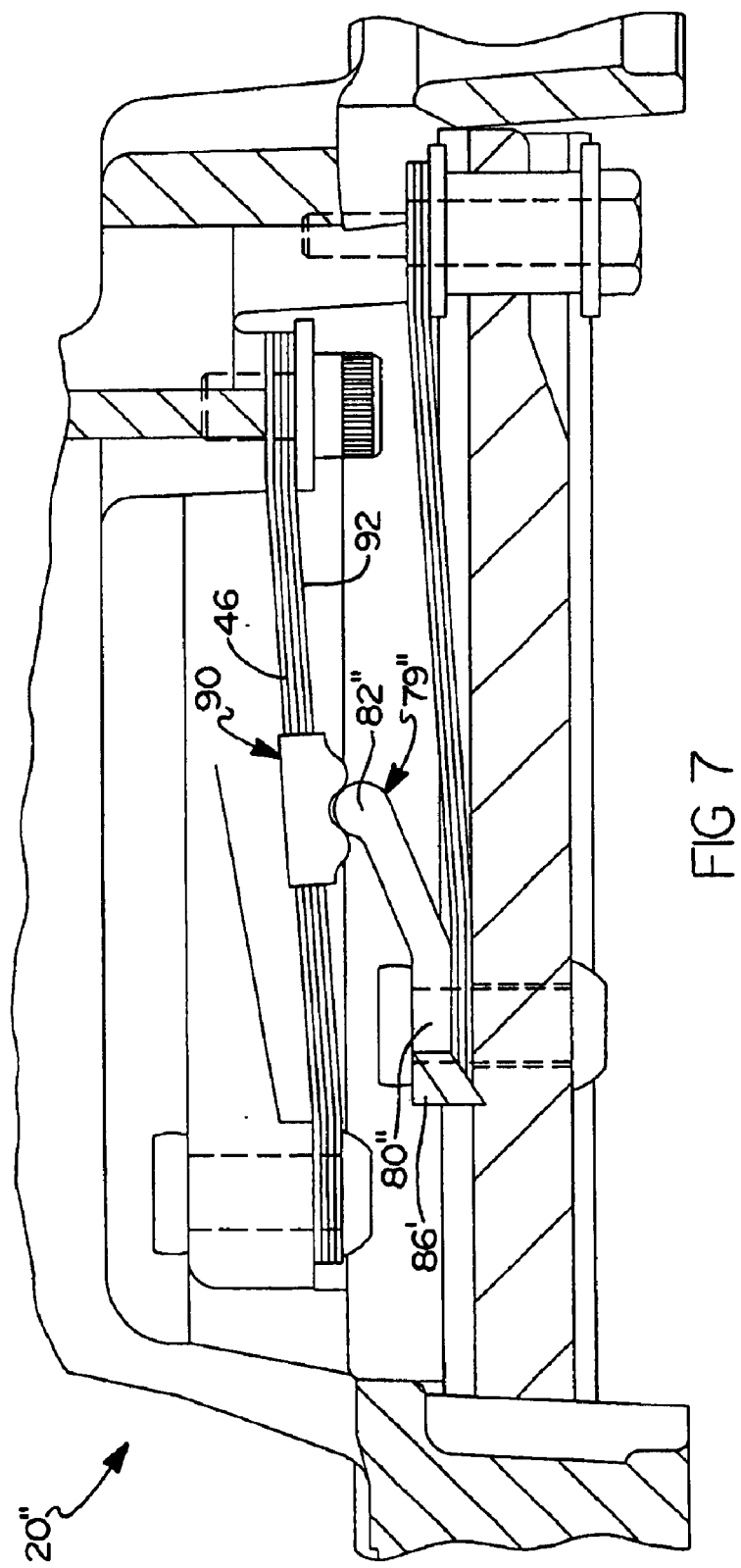

FRICTION CLUTCH WITH INTERMEDIATE PLATE MOUNTING SYSTEM

BACKGROUND OF THE INVENTION

1. Field of the Invention

The present invention relates generally to a multi-disk friction clutch. More particularly, the present invention relates to a multi-disk friction clutch having means for promoting uniform engagement and wear of the friction disks.

2. Description of the Related Art

Friction clutches for use in transmitting rotational torque between a motor vehicle engine and a transmission are well known in the art. One known friction clutch design includes two friction disks, a pressure plate, an intermediate plate, and a clutch cover mounted for rotation about a common axis. The clutch disks, pressure plate and intermediate plate are axially moveable relative to each other so that the pressure plate may be moved relative to the cover to press the two friction disks and the interposed intermediate plate axially against an engine flywheel. A series of drive straps, each generally including one or more resilient elements that are layered to form a leaf spring, are placed around the peripheries of the intermediate plate and pressure plate to provide a biasing force against the plates. During engagement of the clutch, the intermediate plate, pressure plate and friction disks are pressed against the engine flywheel, such that rotation of the flywheel causes rotation of the friction disks. During disengagement of the clutch, the drive straps bias the intermediate plate and pressure plate in a direction away from the flywheel to separate the intermediate plate and pressure plate from the friction disks.

A basic problem with conventional friction clutches is that the intermediate plate is uncontrolled during engagement and disengagement of the clutch. In other words, it is generally difficult to achieve simultaneous engagement of the intermediate plate and the pressure plate with the friction disks and simultaneous disengagement of the friction disks from the interposed intermediate plate. If the friction disks are engaged sequentially rather than simultaneously, the friction material on one friction disk may be consumed more rapidly than the friction material on the other friction disk, thereby reducing the useful life of the clutch.

To ensure virtually simultaneous engagement of the friction disks, several designs have been proposed that force the travel of the intermediate plate to closely coincide with pressure plate travel. One known design incorporates a mechanism that includes a separator element bolted to the radially outer side of the intermediate plate and a lever attached to the mid-point of the drive straps that bias the pressure plate. Engagement of the separator element with the lever limits axial movement of the intermediate plate to approximately half of the axial movement of the pressure plate during engagement and disengagement of the clutch. Accordingly, the friction disks are engaged by the intermediate plate and pressure plate nearly simultaneous, providing substantially uniform wear of the friction disks and a smooth engagement of the clutch.

One limitation of the aforementioned design is that it requires a hole and/or slot to be machined into the radially outer surface of the intermediate plate to connect the mechanism. Another limitation is that the mechanism must be affixed to the intermediate plate using a separate fastener(s), which, together with the machined holes and/or slot in the intermediate plate, add to the complexity and cost of manufacturing the prior art clutch assembly. Still another limitation is that the separator element must directly engage the lever to protect the drive straps from direct and damaging engagement by the separator element, and to provide a more precise control of the displacement of the pressure plate relative to the intermediate plate. Yet another limitation is that maximum axial movement of the intermediate plate is generally uncontrolled, permitting the connected drive straps to be overextended and damaged.

Accordingly, there exists a need for a simplified device that can be easily and cost effectively affixed to a clutch to achieve the desired control of intermediate plate travel relative to the pressure plate.

SUMMARY OF THE INVENTION

In a preferred embodiment of the present invention a friction clutch is provided that includes a clutch cover, an intermediate plate that is spaced apart from an engine flywheel, a first friction disk positioned between the flywheel and the intermediate plate, a pressure plate spaced apart from the intermediate plate and a second friction disk positioned between the intermediate plate and the pressure plate. The clutch further includes at least one first drive strap for applying a load to the intermediate plate, at least one second drive strap for applying a load to the pressure plate and at least one separator arm attached to the intermediate plate. The separator arm engages the second drive strap such that axial movement of the intermediate plate relative to the clutch cover is a fraction of the corresponding axial movement of the pressure plate during engagement and disengagement of the clutch.

In another embodiment of the present invention, at least one fastener is provided for removably connecting the first drive strap to the cover. The intermediate plate is configured to slide axially on a portion of the fastener that extends beyond the cover. The axial movement of the intermediate plate is limited by the fastener to prevent permanent deformation of or otherwise damage the first drive strap.

Among other advantages, the separator arm of the present invention can be attached to the intermediate plate using existing fasteners, i.e., the fasteners used to secure the first drive straps to the intermediate plate, thereby eliminating one or more manufacturing steps. Another advantage is that the separator arm material can be readily tailored to the requirements of a particular clutch assembly to reduce friction between the separator arm and the engaged second drive strap. Unlike the prior art, the separator arm can directly engage the second drive strap, without the use of a lever. Still another advantage is that the intermediate plate can be easily removed from the clutch to facilitate repair or replacement of the friction disks. Yet another advantage is that axial movement of the intermediate plate is precisely controlled to prevent damage to the first drive straps during operation of the clutch.

BRIEF DESCRIPTION OF THE DRAWINGS

FIG. 1 is a diagrammatic representation of a double-disk friction clutch according to a preferred embodiment of the present invention;

FIG. 3A is a side view of a separator arm shown in FIG. 2 according to a preferred embodiment of the present invention;

FIG. 3B is a front cross-sectional view of the separator arm of FIG. 3A;

FIG. 4 is a partial cross-sectional view of the clutch of FIGS. 1 and 2 showing a separator arm according to an alternate embodiment of the present invention;

FIGS. 5A and 5B are front views of the separator arm of FIG. 4 illustrating the preferred methods of connecting a head portion of the separator arm to a base portion;

FIG. 7 is a partial cross-sectional view of the clutch of FIG. 6 showing the separator arm and a friction reducing member;

FIG. 8 is a cross-sectional view of the friction reducing member of FIG. 7;

FIG. 10 is a cross-sectional view of the friction reducing member of FIG. 9.

DESCRIPTION OF THE PREFERRED EMBODIMENT

Figure 2:
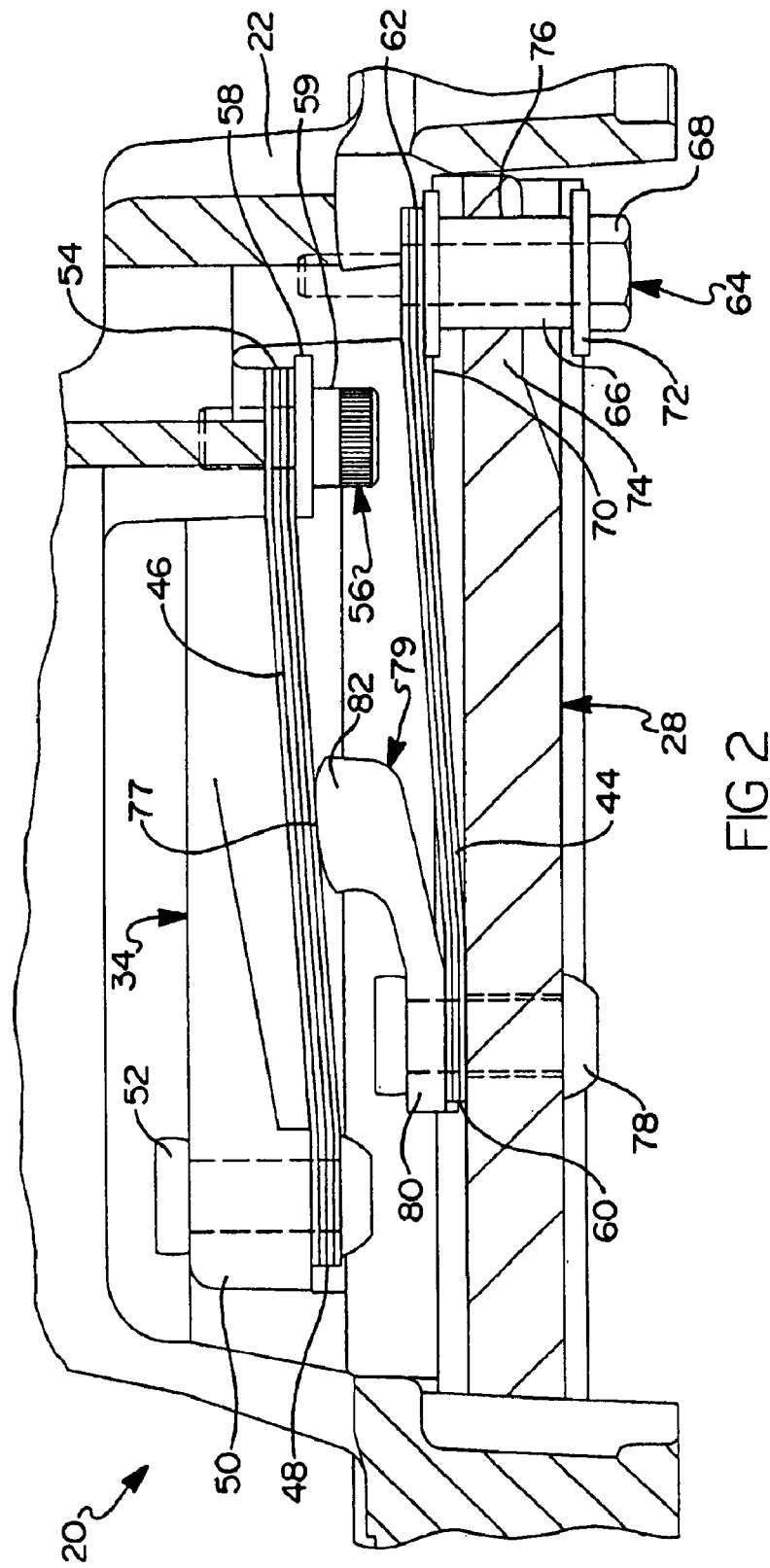
FIG. 2 is a partial sectional view of the clutch of FIG. 1.

Referring now to the drawings, the preferred embodiments of the present invention are shown in detail. Referring to FIG. 1, a diagrammatic representation of a double-disk friction clutch 20 is illustrated, while a partial sectional view of clutch 20 is illustrated in FIG. 2. Clutch 20 includes a cover 22 that is detachably secured to a flywheel 24 of an internal combustion engine (not illustrated). Within cover 22 is disposed a first friction disk 26 adjacent flywheel 24 and an intermediate plate 28 adjacent first friction disk 26. A second friction disk 30 is disposed adjacent a transmission-facing side 32 of intermediate plate 28 and a pressure plate 34 is disposed adjacent a transmission-facing side 36 of second friction disk 30. First and second friction disks 26, 30 are secured for rotation on a transmission input shaft 38, but are axially moveable in relation thereto.

Intermediate plate 28 and pressure plate 34 are secured for rotation with cover 22 and, like friction disks 26 and 30, are axially moveable in relation thereto. In the illustrated embodiment, pressure plate 34 abuts a diaphragm spring 40 that moveably connects pressure plate 34 to a release mechanism 42. Release mechanism 42 is selectively controlled by a vehicle operator to engage and disengage clutch 20. However, it will be appreciated that the present invention can be used with a variety of clamp-load generating release mechanisms besides a diaphragm spring. One example well known in the art is the use of a plurality of levers and compression springs. Another alternative is a centrifugally actuated clutch having both an intermediate plate and a pressure plate. In the centrifugally actuated clutch, the clamping load is generated by pivoted weights, which swing radially outwardly with rotation of the clutch assembly.

Referring now to FIGS. 1 and 2, intermediate plate 28 and pressure plate 34 are moveably connected to cover 22 by first and second drive straps 44 and 46, respectively. Drive straps 44, 46 preferably include a plurality of resilient elements that are layered together to form a leaf spring, as is known in the art. First drive strap 44 provides a force on intermediate plate 28 for biasing intermediate plate 28 in a direction toward pressure plate 34. Similarly, second drive strap 46 provides a force against pressure plate 34 to ensure that pressure plate 34 is in continuous contact with diaphragm spring 40. In return, diaphragm spring 40 applies a clamping force against pressure plate 34 when engagement of clutch 20 is desired. While FIGS. 1 and 2 show only one drive strap 44, 46 for each of intermediate plate 28 and pressure plate 34, respectively, a plurality of drive straps 44 and 46 are preferably distributed about the peripheries of intermediate plate 28 and pressure plate 34.

Referring exclusively to FIG. 2, a first end 48 of second drive strap 46 is fixedly secured to a flange portion 50 of pressure plate 34 by a fastener 52, such as a rivet or the like. A second end 54 of second drive strap 46 is removably connected to cover 22 by a fastener 56, such as a threaded bolt or the like. A washer 58 may be disposed between a head 59 of fastener 56 and second drive strap 46 to ensure adequate contact pressure is distributed over second end 54 of second drive strap 46.

Referring still to FIG. 2, a first end 60 of first drive strap 44 is fixedly secured to intermediate plate 28, while a second end 62 of first drive strap 44 is removably connected to cover 22. To facilitate easy removal of intermediate plate 28 from clutch 20, first drive strap 44 is preferably attached to cover 22 by a threaded fastener 64, such as a threaded bolt or the like. Once secured to cover 22, a significant portion of threaded fastener 64 extends beyond cover 22. This "extended" portion of threaded fastener 64 is preferably provided with a generally cylindrical sleeve 66 that extends between first drive strap 44 and a head 68 of threaded fastener 64. A washer 70, such as a beveled washer, may be provided between sleeve 66 and first drive strap 44 to increase the clamping force applied by threaded fastener 64 against first drive strap 44. Similarly, a generally flat washer 72 may be provided between head 68 and sleeve 66, or a flange may be provided on head 68, to ensure that sufficient contact pressure is distributed from head 68 through the fastened components.

Intermediate plate 28 preferably includes a lug portion 74 through which threaded fastener 64 and sleeve 66 extend to moveably secure intermediate plate 28 to cover 22. As illustrated in FIG. 2, lug portion 74 is provided with an aperture 76 therethrough that is sized to slidingly receive sleeve 66, so that intermediate plate 28 is free to slide on sleeve 66 during operation. The length of sleeve 66, or the degree of axial movement afforded to intermediate plate 28, will generally depend on various factors, including, but not limited to, the size of clutch 20 and the amount of travel needed to compensate for wear in first friction disk 26. However, care must be taken to ensure that the axial movement afforded intermediate plate 28 does not permanently deform or otherwise damage first drive strap 44. Accordingly, washer 72 acts as a "stop" against which intermediate plate 28 is precluded from further axial travel.

First end 60 of first drive strap 44 is fixedly secured to intermediate plate 28 by a fastener 78, such as a rivet or the like. Fastener 78 is also used to attach a separator arm 79 to intermediate plate 28 for movement therewith. In a preferred embodiment, separator arm 79 is made of a relatively high strength material, such as metal or plastic, and includes a base portion 80 secured to intermediate plate 28 and a head portion 82 that engages second drive strap 46. Head portion 82 preferably engages second drive strap 46 proximate a mid-point between fastener 52 and fastener 56, for reasons that will be explained below, but may engage other points on second drive strap 46 as required. Head portion 82 preferably includes a substantially flat land 77 where it contacts second drive strap 46 to reduce contact pressure and friction.

Referring to FIGS. 3A and 3B, base portion 80 includes an aperture 84 therethrough that is sized to receive fastener 78 and a lip 86 that extends along at least a portion of base

80. Once assembled onto intermediate plate 28, lip 86 abuts first drive strap 44 and substantially prevents rotation of separator arm 79 about a longitudinal axis (not shown) of fastener 78 during operation of clutch 20. Alternatively, lip 86 may take other forms, such as, for example, lip 86' illustrated in FIGS. 4–8.

Referring to FIG. 4, an alternate embodiment of the present invention is shown in detail. In this embodiment, a clutch 20' is provided that is substantially similar to clutch 20 described in the first embodiment with a least one exception, namely, the configuration of separator arm 79. In this embodiment, a separator arm 79' is provided that includes a separate base portion 80' that is secured to a head portion 82' prior to assembly of separator arm 79' onto intermediate plate 28. As illustrated in FIG. 5A, head portion 82' may be secured to base portion 80' by press fitting a shaft 87 on head portion 82' into an aperture 88 in base portion 80'. Alternatively, other methods may be used to secure head portion 82' to base portion 80', such as using snap hooks, as illustrated in FIG. 5B, or welding head portion 82' to base portion 80'. An advantage of the embodiment illustrated in FIG. 4 is that head portion 82' can be manufactured out of a low friction material, such as PTFE, whereas base portion 80' can be manufactured out of a second, perhaps less costly material.

Figure 6:
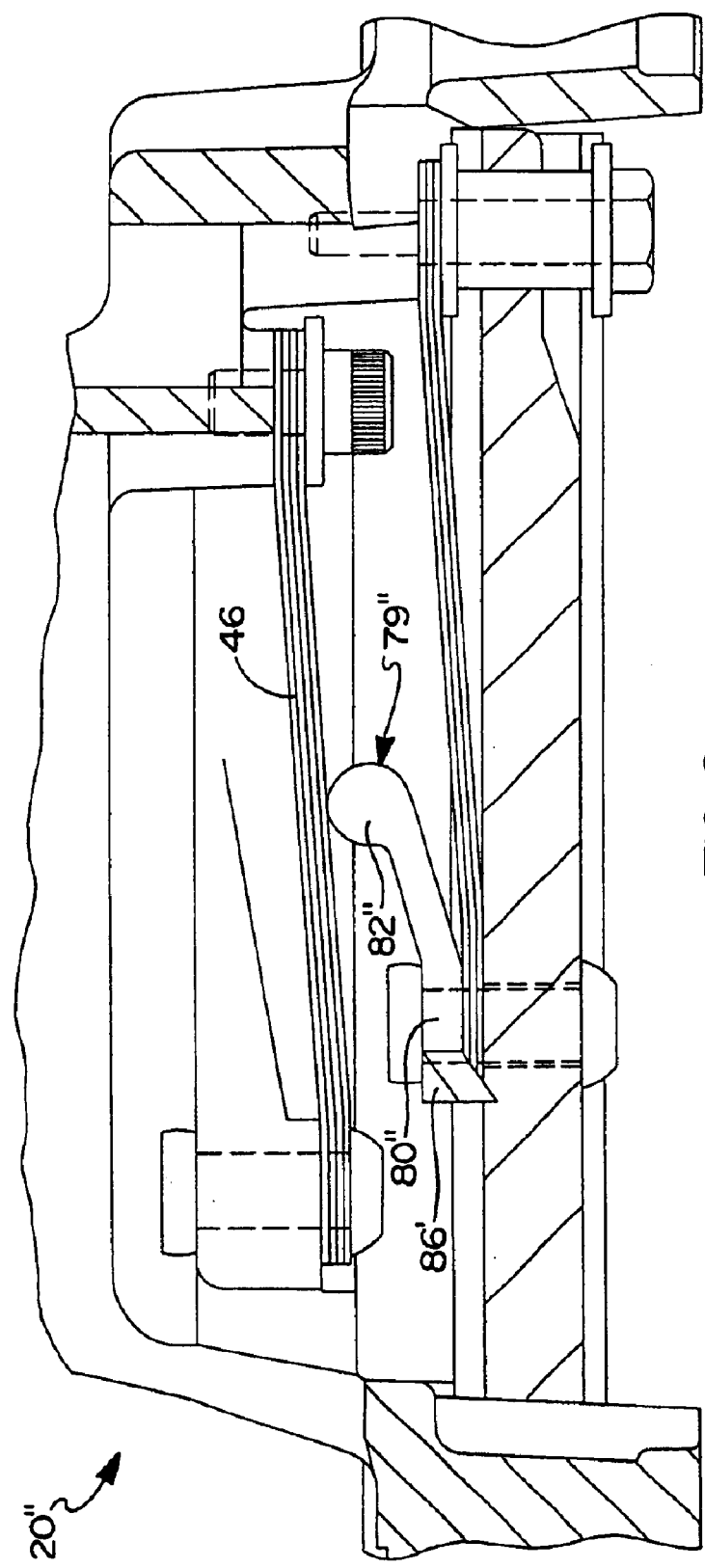
FIG. 6 is a partial cross-sectional view of the clutch of FIGS. 1 and 2 showing a separator arm according to another alternate embodiment of the present invention.
Figure 9:
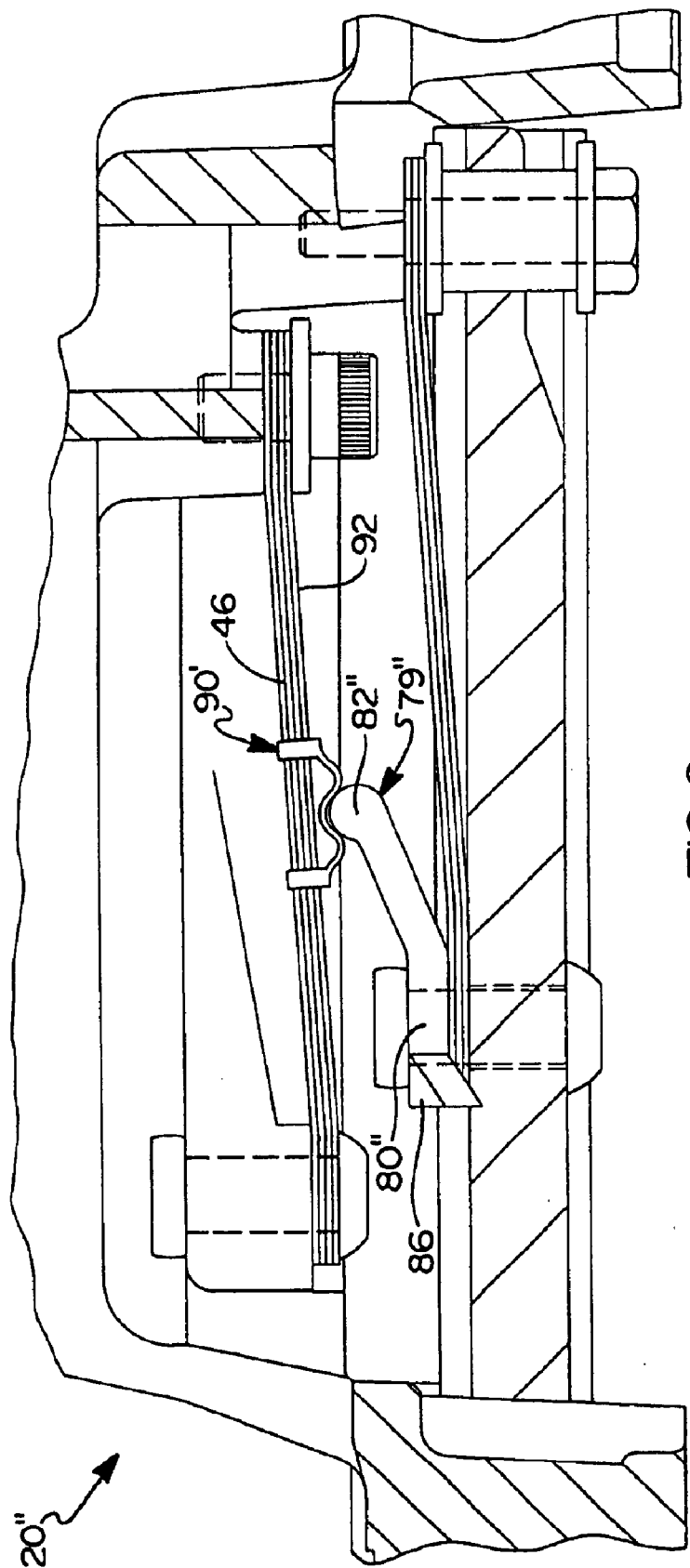
FIG. 9 is a partial cross-sectional view of the clutch of FIG. 7 showing an alternate embodiment of the friction reducing member.

Referring to FIGS. 6, 7 and 9, another alternate embodiment of the present invention is shown in detail. In this embodiment, a separator arm 79" is provided that includes a generally round head portion 82", as opposed to substantially flat head portion 82 provided in the preferred embodiment. Separator arm 79" provides a concentrated point of contact between head portion 82" and second drive strap 46, which more precisely defines the axial movement of intermediate plate 28.

Optionally, in clutch assemblies that exhibit a relatively high level of friction between separator arm 79" and second drive strap 46, a friction reducing member 90 may be disposed between second drive strap 46 and head portion 82", as illustrated in FIG. 7. However, friction reducing member 90 is not necessary due to the friction reducing characteristics of separator arm 79 and adequate control of the displacements of intermediate plate 28 and pressure plate 34 can be achieved with the simplified intermediate plate control system.

Referring to FIG. 8, friction reducing member 90 includes a contoured surface 92 that engages head portion 82" and a duct 94 therethrough for receiving second drive strap 46. Friction reducing member 90 may be manufactured out of any suitable friction reducing material, such as PTFE.

Referring to FIGS. 9 and 10, an alternate embodiment of friction reducing member 90 is shown in detail. In this embodiment a friction reducing member 90' is provided that includes a pair bendable clamps 96 that are bent around second drive strap 46 and an contoured portion 98 that engages head portion 82". An advantage of this embodiment is that can be more cost effectively manufactured, such as by stamping the shape of friction reducing member 90' out of a suitable metal.

Advantages of the present invention will become apparent upon review of the assembly and operation of clutch 20, as described herein below. In the assembly of clutch 20, first clutch disk 26 is moved into contact with flywheel 24 and then a pre-assembled cover assembly, which includes intermediate plate 28, second friction disk 30, pressure plate 34, diaphragm spring 40 and cover 22, are secured to flywheel 24. Cover 22 may be divided into two parts for simpler assembly and disassembly of the intermediate plate 28, however, such a division of cover 22 is not necessary.

When clutch 20 is disengaged, that is, when diaphragm spring 40 is moved to the position shown in FIG. 1, pressure plate 34 automatically moves away from flywheel 24 due to the biasing force of second drive strap 46. Virtually simultaneously, intermediate plate 28 automatically moves away from flywheel 24 due to the biasing force of first drive strap 44. However, due to the contact of separator arm 79 proximate the mid-point of second drive strap 46, the axial distance intermediate plate 28 moves is approximately one-half the axial distance pressure plate 34 moves. In this manner, it is ensured that first and second friction disks 26, 30 are disengaged virtually simultaneously. It will be appreciated that axial movement of intermediate plate 28 relative to pressure plate 34 can be easily modified by altering the point of engagement between separator arm 79 and second drive strap 46. For example, the dimensions of separator arm 79 can be modified to alter the engagement point of separator arm 79 on second drive strap 46.

When clutch 20 is engaged, the various components move in a direction opposite the direction of disengagement, i.e., to the left in FIG. 1. Again, due to the engagement of separator arm 79 with second drive strap 46, intermediate plate 28 will move approximately one-half the distance pressure plate 34 moves. In this manner, it is ensured that first and second friction disks 26, 30 are engaged virtually simultaneously and smoothly, due to axial movement of intermediate plate 28 relative to cover 22 being a precisely defined fraction of the corresponding axial movement of pressure plate 34. Additionally, axial movement of intermediate plate 28, and indirectly pressure plate 34, is limited by fasteners 64 to substantially prevent first and second drive straps 44, 46 from becoming damaged due to excessive wear in friction disk 26, 30.

Among other advantages, separator arm 79 can be attached to intermediate plate 28 using existing fasteners, i.e., fastener 78 used to secure first drive strap 44 to intermediate plate 28, thereby eliminating one or more manufacturing steps. Another advantage is that the material of separator arm 79, more particularly head portion 82, can be easily tailored to the requirements of a particular clutch assembly to reduce friction between separator arm 79 and second drive strap 46, and decrease component wear. Unlike the prior art, separator arm 79 can be engaged directly with second drive strap 46, without the use of a lever. Still another advantage is that intermediate plate 28 can be easily removed from clutch 20 to facilitate repair or replacement of friction disks 23, 30. Yet another advantage is that axial movement of intermediate plate 28 is precisely controlled by fasteners 64 to prevent damage to first and second drive straps 44, 46 during operation of clutch 20.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A friction clutch comprising:
    a flywheel rotatable about an axis of rotation;
    a clutch cover fixed to the flywheel for rotation therewith;
    an intermediate plate spaced apart from the flywheel and disposed within the cover;

a first friction disk positioned between the flywheel and intermediate plate;

a pressure plate disposed within the cover between the intermediate plate and the cover and spaced apart from the intermediate plate;

a second friction disk positioned between the intermediate plate and the pressure plate;

a first drive strap disposed between the intermediate plate and the cover, the first drive strap rotatively fixing the intermediate plate to the cover and biasing the intermediate plate away from the flywheel;

a second drive strap disposed between the pressure plate and the cover, the second drive strap rotatively fixing the pressure plate to the cover and biasing the pressure plate away from the flywheel; and at least one fastener that removably connects the first drive strap to the cover, the intermediate plate configured to slide axially on a portion of the fastener that extends beyond the cover.

2. The clutch according to claim 1, further including a sleeve disposed between the fastener and the intermediate plate.

3. The clutch according to claim 2, wherein the intermediate plate includes a lug portion having an aperture therethrough that is sized to slidingly receive the sleeve.

4. The clutch according to claim 1, wherein the fastener is configured to limit axial movement of the intermediate plate.

5. A friction clutch comprising:

a flywheel rotatable about an axis of rotation;

a clutch cover fixed to the flywheel for rotation therewith;

an intermediate plate spaced apart from the flywheel and disposed within the cover;

a first friction disk positioned between the flywheel and intermediate plate;

a pressure plate disposed within the cover between the intermediate plate and the cover and spaced apart from the intermediate plate;

a second friction disk positioned between the intermediate plate and the pressure plate;

a first drive strap disposed between the intermediate plate and the cover, the first drive strap rotatively fixing the intermediate plate to the cover and biasing the intermediate plate away from the flywheel;

a second drive strap disposed between the pressure plate and the cover, the second drive strap rotatively fixing the pressure plate to the cover and biasing the pressure plate away from the flywheel;

a fastener that removably connects the first drive strap to the cover, the intermediate plate configured to slide axially on a portion of the fastener that extends beyond the cover; and a separator arm attached to the intermediate plate, the separator arm engaging the second drive strap such that axial movement of the intermediate plate relative to the clutch cover is a fraction of the corresponding axial movement of the pressure plate during engagement and disengagement of the clutch.

6. The clutch according to claim 5, wherein the separator arm includes a head portion that engages the second drive strap and a base portion connected to the intermediate plate.

7. The clutch according to claim 6, wherein the head portion is secured to the base portion by a press fit connection.

8. The clutch according to claim 6, wherein the head portion is secured to the base portion by a snap-together connection.

9. The clutch according to claim 5, further including a sleeve disposed between the fastener and the intermediate plate.

10. The clutch according to claim 9, wherein the intermediate plate includes a lug portion having an aperture therethrough that is sized to slidingly receive the sleeve.

11. The clutch according to claim 5, wherein the fastener is configured to limit axial movement of the intermediate plate.

12. A friction clutch comprising:

a flywheel rotatable about an axis of rotation;

a clutch cover fixed to the flywheel for rotation therewith;

an intermediate plate spaced apart from the flywheel and disposed within the cover;

a first friction disk positioned between the flywheel and intermediate plate;

a pressure plate disposed within the cover between the intermediate plate and the cover and spaced apart from the intermediate plate;

a second friction disk positioned between the intermediate plate and the pressure plate;

a first drive strap disposed between the intermediate plate and the cover and the first drive strap rotatively fixing the intermediate plate to the cover and biasing the intermediate plate away from the flywheel;

a second drive strap disposed between the pressure plate and the cover and the second drive strap rotatively fixing the pressure plate to the cover and biasing the pressure plate away from the flywheel; and a separator arm having a base portion fixed to the intermediate plate, and a separate friction reducing head portion secured to the base portion and engaging the second drive strap so as to follow deflection of the second drive strap at a location of engagement therebetween such that axial travel of the intermediate plate relative the clutch cover associated with moving between a clutch engaged condition and a clutch disengaged condition is a fraction of the corresponding axial movement of the pressure plate during engagement and disengagement of the clutch.

13. The friction clutch according to claim 12, wherein the head portion is circumferentially and axially offset from the base portion and cantilevered over the first drive strap, thereby permitting deflection of the first drive strap toward the head portion in the engaged condition.

14. The friction clutch according to claim 12, wherein the head portion engages the second drive strap directly.

15. The friction clutch according to claim 12, wherein a friction reducing member is disposed between the head portion and the second drive strap.

16. The clutch according to claim 12, wherein the head portion includes a substantially flat land where the separator arm contacts the second drive strap.

17. The clutch according to claim 12, wherein the base portion includes an aperture therethrough that receives a fastener to connect the separator arm and the first drive strap to the intermediate plate.

18. The clutch according to claim 12, wherein at least one of the head portion and the base portion includes a connector adapter to secure the head portion to the base portion.

19. The clutch according to claim 18, wherein the connector is a press fit style connection.

20. The clutch according to claim 18, wherein the connector is a snap-together connection.

21. The clutch according to claim 12, wherein the head portion is made from a friction reducing material.

22. The clutch according to claim 21, wherein the friction reducing material is PTFE.

23. A friction clutch comprising:

a flywheel rotatable about an axis of rotation;

a clutch cover fixed to the flywheel for rotation therewith;

an intermediate plate spaced apart from the flywheel and disposed within the cover;

a first friction disk positioned between the flywheel and intermediate plate;

a pressure plate disposed within the cover between the intermediate plate and the cover and spaced apart from the intermediate plate;

a second friction disk positioned between the intermediate plate and the pressure plate;

a first drive strap disposed between the intermediate plate and the cover, the first drive strap rotatively fixing the intermediate plate to the cover and biasing the intermediate plate away from the flywheel;

a second drive strap disposed between the pressure plate and the cover and the second drive strap rotatively fixing the pressure plate to the cover and biasing the pressure plate away from the flywheel; and a separator arm having a base portion fixed to the intermediate plate, and a head portion engaging the second drive strap so as to follow deflection of the second drive strap at a location of engagement therebetween such that axial travel of the intermediate plate relative the clutch cover associated with moving between a clutch engaged condition and a clutch disengaged condition is a fraction of the corresponding axial movement of the pressure plate during engagement and disengagement of the clutch, the head portion including a first generally curved portion and a second generally flat portion where the separator arm contacts the second drive strap.

24. The clutch according to claim 23, wherein the separator arm includes at least one shoulder to inhibit rotation of the separator arm relative to the intermediate plate.

25. A friction clutch comprising:

a flywheel rotatable about an axis of rotation;

a clutch cover fixed to the flywheel for rotation therewith;

an intermediate plate spaced apart from the flywheel and disposed within the cover;

a first friction disk positioned between the flywheel and intermediate plate;

a pressure plate disposed within the cover between the intermediate plate and the cover and spaced apart from the intermediate plate;

a second friction disk positioned between the intermediate plate and the pressure plate;

a first drive strap disposed between the intermediate plate and the cover, the first drive strap rotatively fixing the intermediate plate to the cover and biasing the intermediate plate away from the flywheel;

a second drive strap disposed between the pressure plate and the cover, the second drive strap rotatively fixing the pressure plate to the cover and biasing the pressure plate away from the flywheel;

a separator arm fixed to the intermediate plate;

a friction reducing member slidingly attached to the second drive strap and disposed between the separator arm and the second drive strap, the separator arm engaging the friction reducing member so as to follow deflection of the second drive strap at a location of engagement therebetween such that axial travel of the intermediate plate relative the clutch cover associated with moving between a clutch engaged condition and a clutch disengaged condition is a fraction of the corresponding axial movement of the pressure plate during engagement and disengagement of the clutch.

26. The clutch according to claim 25, wherein the friction reducing member is made from a friction reducing material.

27. The clutch according to claim 26, wherein the friction reducing material is PTFE.

28. The clutch according to claim 25, wherein the friction reducing member includes a contoured engagement surface and a duct therethrough for receiving the second drive strap.

29. The clutch according to claim 25, wherein the friction reducing member includes a contoured engagement surface and at least one bendable clamp.

* * * * *

UNITED STATES PATENT AND TRADEMARK OFFICE
CERTIFICATE OF CORRECTION

PATENT NO. : 6,866,132 B2 Page 1 of 1
DATED : March 15, 2005
INVENTOR(S) : Daniel V. Gochenour et al.

It is certified that error appears in the above-identified patent and that said Letters Patent is hereby corrected as shown below:

<u>Column 9,</u>
Lines 2 and 4, change "connection" to -- connector --

Signed and Sealed this

Twenty-eighth Day of June, 2005

JON W. DUDAS
*Director of the United States Patent and Trademark Office*